March 12, 1946.   J. M. SCHMIED   2,396,538
ELECTRICAL INDICATOR UNIT
Filed Feb. 19, 1944   2 Sheets-Sheet 1
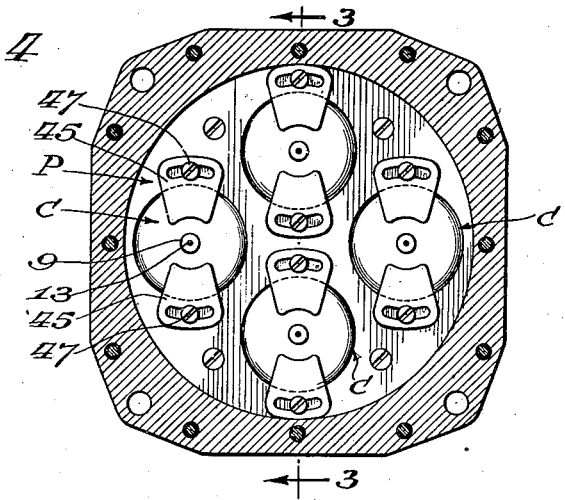
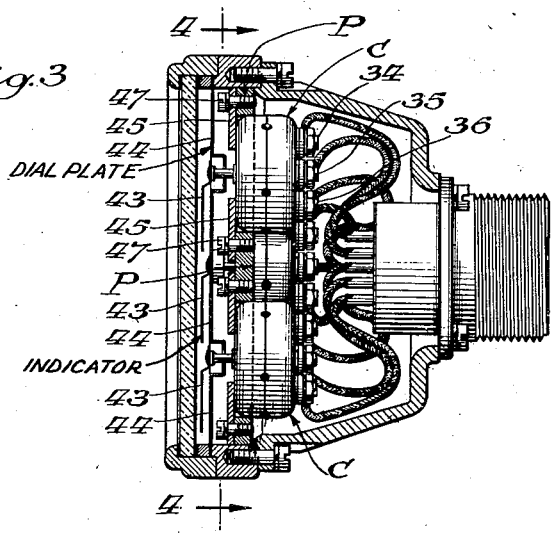
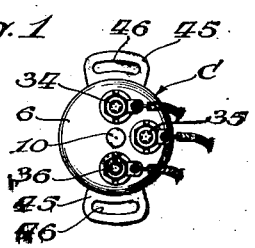 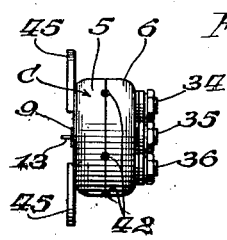
INVENTOR.
Joseph M. Schmied
BY Thomas S. Ross
Attorney March 12, 1946.  J. M. SCHMIED  2,396,538
ELECTRICAL INDICATOR UNIT
Filed Feb. 19, 1944  2 Sheets-Sheet 2
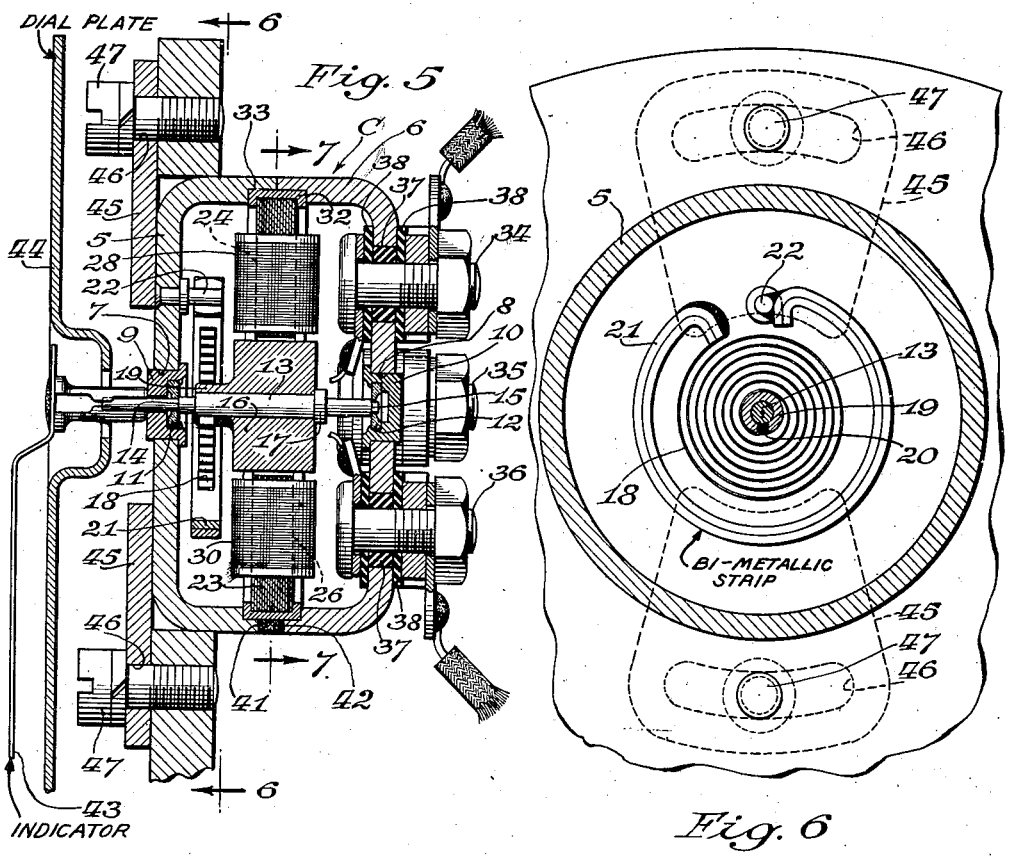
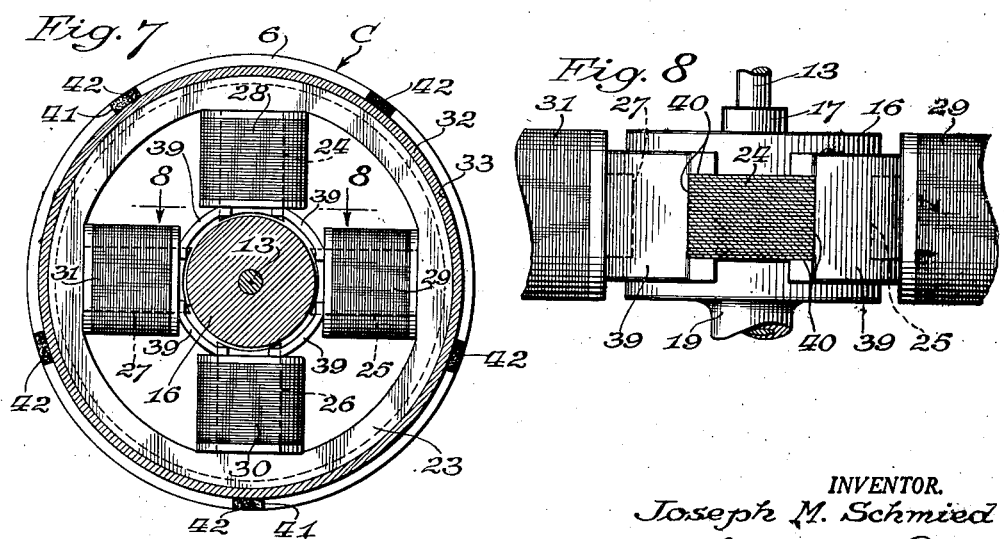
INVENTOR.
Joseph M. Schmied
BY Thomas S. Roe
Attorney.

Patented Mar. 12, 1946

2,396,538

UNITED STATES PATENT OFFICE 2,396,538

ELECTRICAL INDICATOR UNIT

Joseph M. Schmied, Chicago, Ill.

Application February 19, 1944, Serial No. 523,146

5 Claims. (Cl. 171—95)

This invention relates generally to an electrical indicator unit of the type employed for remotely indicating speeds, pressures, specific positions of elements, etc., and is a continuation in part of my co-pending application Serial No. 519,964, filed January 27, 1944, for Improvements in remote electrical indication.

Various structures are available for indicating remote conditions on airplanes such as the "Selsyn" or "Autosyn" systems, but such apparatus is not only costly to manufacture and install, but requires highly skilled labor in addition to elaborate equipment and space when service or repairs are needed.

The principal objects of the present invention therefore, are to obviate the foregoing disadvantages found in existing electrical indicating instruments, by providing an electrically driven indicating unit which is simple, efficient; extremely small; of rugged construction and light in weight; which can be safely shipped and handled; and which can be removed from an instrument and replaced by a new unit by someone not skilled in the servicing of fine electrical instruments, thus eliminating skilled personnel and equipment in the field and reducing the time heretofore needed for making repairs.

It is a further object of the invention to provide a structure which may be sealed at the time of manufacture and of such relatively low cost that damaged units can be replaced with new units, by unskilled help in an economical manner and, without the necessity of attempting repairs.

Still another object of the invention is to provide a structure which operates upon the well-known induction motor principle; i. e. one which employs two alternating fluxes to create a rotating field, the torque of which drives the rotor, characterized by the fact that such fluxes are not in time or space phase with each other as fully set forth in my above-mentioned co-pending application.

Still further and more limitedly, it is an object of the invention to provide indicating mechanism in the form of a sealed unit, and in which a full scaled movement of the indicator can be had either from a very slight motion or from a more extensive motion of the prime mover, and in which simple and efficient compensating means are employed to reduce to a minimum inaccuracies caused by extreme changes of ambient temperature.

Still further objects and advantages, in addition to those already pointed out, will become apparent as the description proceeds in connection with the accompanying drawings in which:

Figs. 1 and 2 are rear and side elevational views respectively of an electrical indicating unit constructed in accordance with the present invention and shown actual size.

Fig. 3 is a central vertical section from the line 3—3 of Fig. 3 of an aircraft instrument having a plurality of the units shown in Fig. 2 mounted upon the standard front plate.

Fig. 4 is a transverse vertical section on the line 4—4 of Fig. 3 to illustrate the manner in which the units are adjustably mounted.

Fig. 5 is a highly magnified view of the unit shown partly in elevation and partly in vertical section.

Fig. 6 is a central vertical section on the line 6—6 of Fig. 5 parts appearing in elevation.

Fig. 7 is a vertical cross-section on the line 7—7 of Fig. 5 as indicated by the arrows to clearly illustrate the shunt bars, and Fig. 8 is a fragmentary detailed view showing the method of mounting the shunt bars upon the stator pole shoes.

Referring to Figs. 2 and 5 of the drawings, the reference numerals 5 and 6 indicate the two halves or shells of the casing which is designated as a whole by the reference character C. These shells have central bores 7 and 8 in which bearing sleeve 9 and 10, respectively, are mounted. Jewel bearings 11 and 12 preferably have a press fit into bores in the sleeves, and the reduced ends of rotor shaft 13 are journaled in these bearings as clearly shown. Shoulders 14 and 15, formed by the reduced ends of rotor shaft 13 serve as thrust bearings for centering the rotor 16 within the stator.

The rotor is preferably made from a solid Manganin cylinder, or other metal having a minimum change in electrical resistance over a wide range of ambient temperature change, such as Ohmax, Advance, and the like. The rotor has a press fit upon the shaft 13 and is accurately located by the radial flange 17 formed integral with said shaft. Torque applied to the rotor, in a manner presently explained, is negatively opposed by a hair spring 18, one end of which is securely anchored in a slot in the hub 19 of said rotor, preferably by a drop of solder 20 (Fig. 6), and its other end anchored in a similar manner, to the free end of a bimetallic strip 21 which serves as a compensator for said spring during ambient temperature changes. The fixed end of compensator strip 21 may be soldered to a pin 22 which projects inwardly from the shell 5.

The stator comprises silicon iron laminations 23 of approximately annular form having inwardly projecting pole shoes 24, 25, 26, and 27 respectively. Wound upon these pole shoes is a series of coils 28, 29, 30, and 31 respectively, and the laminations 23 are firmly held in place by a channel ring member 32. This ring is formed around the laminations and then preferably machined to accurately fit into a machined recess 33 formed in the abutting edges of shells 5 and 6 when the unit is assembled.

In the present embodiment a three-wire circuit for the coils is shown as comprising the three electrical terminals 34, 35, and 36 which are mounted upon shell 6 and extend through the insulating bushings 37 and washers 38. It should be noted however, that the unit can be actuated from any alternating current source whether single phase, two phase or three phase.

Referring now to Figs. 7 and 8, shunt bars 39 made from nickel-steel or like temperature compensating metal, the metallic conductivity of which increases inversely with temperature change as fully explained in my aforesaid copending application, are preferably located between the pole shoes of the stator laminations 23. Each shunt bar has a pair of notches 40 to snugly receive a pair of pole shoes and in this manner no extraneous fastening means is necessary to hold these bars in place.

When the unit is entirely assembled within casing C and the shells 5 and 6 have been finally pressed upon the ring 32, openings 41 in the abutting edges of the shells may then be filled with solder, indicated at 42, to effectively seal the instrument.

If the indicator is to be used as a tachometer the hub portion of a conventional pointer or hand 43 is slipped over the protruding end of rotor shaft 13, and an appropriate scale (not shown) may be painted or etched on the dial plate 44. Novel means are provided for adjustably mounting the casing C to the conventional or standard front plate P of the instrument and relatively to the dial plate 44, to accurately adjust the zero position of pointer 43. Such means comprises a pair of arms 45, preferably spot welded to the end of shell 5, each being provided with an arcuate slot 46 to receive the threaded studs 47 screwed into the plate P as clearly shown in Figs. 3 to 6 respectively.

From the foregoing it is believed that operation of the instrument will be clear to those skilled in the art of electrical indicators, and that voltage induced in the coils by the alternating current supply, creates a rotating field to produce a torque upon the rotor 16, such torque being opposed by the hair spring 18.

While I have shown a particular embodiment of my invention, it will be understood by those skilled in the art that numerous changes and modifications may be made in the construction of the device shown without departing from the underlying principles of the invention.

Having thus described my invention what I claim as new and desire to secure by Letters Patent is:

1. An electrical indicator unit for remotely indicating speed, pressure, specific positions of elements and the like comprising, in combination, a dial plate, a casing formed by a pair of shell-like members the abutting edges of which are sealed at the time the unit is assembled, an alternating current induction motor housed within said casing including a solid rotor and a laminated stator, a rotor shaft journaled in jeweled bearings carried by said casing, radial pole shoes formed integrally with said stator laminations, coils wound upon said shoes, a source of alternating current for said coils, temperature compensating shunt bars mounted between said shoes respectively, a hair spring opposing rotation of said rotor, a bimetallic strip to compensate for temperature change of said spring, an indicator hand carried by said rotor shaft and mounted for movement therewith, and means for adjustably mounting said casing including a second plate-like member to permit a zero setting of said indicator hand relative to said dial plate.

2. An electrical indicator unit as set forth in claim 1, wherein the solid rotor is made from material having a minimum change in electrical resistance over a wide range of ambient temperature change.

3. An electrical indicator unit as specified in claim 1, wherein the means for adjustably mounting the casing to permit a zero setting of the indicator hand comprises a plurality of arms attached to the casing each of which arms is provided with an arcuate slot substantially as described and for the reasons specified.

4. An electrical indicator unit as specified in claim 1, wherein the temperature compensating shunt bars have a notch in each end to snugly receive the adjacent pole shoes so that no extraneous fastening means is needed to mount said bars.

5. An electrical indicator unit of the class described comprising, in combination, a two part sealed casing, an alternating current induction motor mounted within said casing including a solid rotor formed of material having a minimum change in electrical resistance over a wide range of ambient temperature change and a laminated stator, means to support said stator within said casing including a ring the outer periphery of which snugly fits within a recess formed in the abutting edges of said casing parts, radial pole shoes forming a part of said stator, coils wound upon said shoes respectively, a hair spring opposing rotation of said rotor, temperature compensating means for said hair spring in the form of a bi-metallic strip, and arcuate shaped temperature compensating shunt bars mounted between said pole shoes substantially as described.

JOSEPH M. SCHMIED.